United States Patent
Sih et al.

(10) Patent No.: US 7,769,950 B2
(45) Date of Patent: Aug. 3, 2010

(54) CACHED MEMORY SYSTEM AND CACHE CONTROLLER FOR EMBEDDED DIGITAL SIGNAL PROCESSOR

(75) Inventors: Gilbert Christopher Sih, San Diego, CA (US); Charles E. Sakamaki, Honolulu, HI (US); De D. Hsu, San Diego, CA (US); Jian Wei, San Diego, CA (US); Richard Higgins, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 729 days.

(21) Appl. No.: 10/807,648

(22) Filed: Mar. 24, 2004

(65) Prior Publication Data

US 2005/0216666 A1 Sep. 29, 2005

(51) Int. Cl.
*G06F 12/00* (2006.01)
(52) U.S. Cl. ............... 711/118; 711/117; 711/122; 711/138; 711/152
(58) Field of Classification Search ......... 711/117–119, 711/122, 133, 138, 152, 159, 170
See application file for complete search history.

(56) References Cited

U.S. PATENT DOCUMENTS

| | | | | |
|---|---|---|---|---|
| 5,459,742 A | * | 10/1995 | Cassidy et al. ............ | 714/769 |
| 5,895,487 A | | 4/1999 | Boyd et al. | |
| 5,987,590 A | * | 11/1999 | Wing So ................... | 712/35 |
| 6,128,703 A | * | 10/2000 | Bourekas et al. ........... | 711/138 |
| 6,192,449 B1 | * | 2/2001 | Circello et al. ............ | 711/133 |
| 6,272,597 B1 | | 8/2001 | Fu et al. .................. | 711/131 |
| 6,704,820 B1 | | 3/2004 | Walker et al. | |
| 6,704,841 B2 | * | 3/2004 | Chaudhry et al. .......... | 711/137 |
| 6,721,855 B2 | * | 4/2004 | Chaudhry et al. .......... | 711/137 |

(Continued)

FOREIGN PATENT DOCUMENTS

EP 1215581 6/2002

(Continued)

OTHER PUBLICATIONS

Hashimoto, Takashi et al. "A 90 mW MPEG-4 Video Code LSI With the Capability for Core Profile". IEICE Trans Electron. vol. E86, C. No. 7. Jul. 2003. pp. 1374-1384.

(Continued)

*Primary Examiner*—Jasmine Song
(74) *Attorney, Agent, or Firm*—Peter M. Kamarchik; Nicholas J. Pauley; Sam Talpalatsky

(57) ABSTRACT

A cached memory system that can handle high-rate input data and ensure that an embedded DSP can meet real-time constraints is described. The cached memory system includes a cache memory located close to a processor core, an on-chip memory at the next higher memory level, and an external main memory at the topmost memory level. A cache controller handles paging of instructions and data between the cache memory and the on-chip memory for cache misses. A direct memory exchange (DME) controller handles user-controlled paging between the on-chip memory and the external memory. A user/programmer can arrange to have the instructions and data required by the processor core to be present in the on-chip memory well in advance of when they are actually needed by the processor core.

36 Claims, 9 Drawing Sheets

U.S. PATENT DOCUMENTS

| | | |
|---|---|---|
| 6,848,030 B2 | 1/2005 | Tokar et al. |
| 6,895,475 B2 * | 5/2005 | Volpe et al. .................. 711/137 |
| 6,944,724 B2 * | 9/2005 | Chaudhry et al. ........... 711/154 |
| 6,978,350 B2 * | 12/2005 | Birk et al. .................... 711/133 |
| 7,194,576 B1 * | 3/2007 | Boyle .......................... 711/113 |
| 2004/0093479 A1 * | 5/2004 | Ramchandran ............. 712/210 |
| 2005/0025315 A1 * | 2/2005 | Kreitzer ...................... 380/270 |

FOREIGN PATENT DOCUMENTS

| | | |
|---|---|---|
| KR | 1999-45059 | 6/1999 |
| KR | 2001-34125 | 3/2004 |
| WO | 9813763 | 4/1999 |

OTHER PUBLICATIONS

Patterson et al., "Computer Architecture a Quantitative Approach," 2nd Edition, Morgan Kaufmann Pulisher, Inc., Dec. 31, 1996.
International Search Report—PCT/US05/008373, International Searching Authority—European Patent Office, Nov. 25, 2005.
Written Opinion—PCT/US05/008373, International Searching Aurthority—European Patent Office, Nov. 25, 2005.

* cited by examiner

US 7,769,950 B2

CACHED MEMORY SYSTEM AND CACHE CONTROLLER FOR EMBEDDED DIGITAL SIGNAL PROCESSOR

BACKGROUND

I. Field

The present invention relates generally to electronics, and more specifically to a cached memory system and a cache controller for an embedded digital signal processor (DSP).

II. Background

DSPs are specialized microprocessors that are specifically designed to execute mathematical computations very rapidly. DSPs are widely used in a variety of consumer electronic devices such as cellular phones, personal digital assistants (PDAs), and so on. For example, a cellular phone typically includes an application specific integrated circuit (ASIC) to perform signal processing for wireless communication, and this ASIC may contain an embedded microprocessor for general-purpose use and an embedded DSP to perform computation-intensive tasks.

Microprocessors and DSPs both use memory to hold instructions and data, so their performance is highly dependent on the characteristics of the memory system. As microprocessors and DSPs scale upward in clock speed to meet increasing processing demands, it is necessary to use a cached memory system so that (1) memory accesses do not become a bottleneck and (2) memory speed does not limit the processor clock speed. The cache memory system typically includes an external main memory and one or more cache memories. Cache memories are small, fast memories located on-chip and close to the processors in order to store instructions and data used by these processors. The fast cache memories improve processing speed because the processors can retrieve input data and store results faster. The main memory is a large, slower memory located off-chip and stores instructions and data for the cache memories.

The use of the cached memory system can cause several problems for the embedded DSP. First, reception of high-rate input data is complicated because of overhead needed to determine whether the data should be stored in the cache memories or the external memory. Second, it may be difficult to ensure completion of real-time processing tasks within specified time deadlines. This difficulty may result when the instructions and/or data needed by the DSP is not in the cache memories, in which case the DSP would need to wait for the instructions/data to be fetched from the external memory. These two problems are exacerbated when one or more other processors share the external memory with the DSP, and the DSP is not guaranteed instant access to the external memory.

There is therefore a need in the art for a cached memory system that can address the problems described above for an embedded DSP.

SUMMARY

A cached memory system that can handle high-rate input data and ensure that an embedded DSP can meet real-time constraints is described herein. In an embodiment, the cached memory system includes a cache memory located close to a processor core, an on-chip memory at the next higher memory level, and an external main memory at the top memory level. A cache controller handles paging of instructions and data between the cache memory and the on-chip memory whenever cache misses are encountered. A direct memory exchange (DME) controller handles user-controlled paging between the on-chip memory and the external memory. A user/programmer can arrange to have the instructions and data required by a processor core to be present in the on-chip memory well in advance of when the instructions and data are actually needed by the processor core. This ensures that the DSP can meet real-time constraints even though the DSP is not guaranteed instant access to the external memory.

A cache controller that allows two processing units (e.g., the processor core and a direct memory access (DMA) controller) to simultaneously access two memories at two different levels in the cached memory system is also described herein. In an embodiment, the cache controller has two sets of input/output (I/O) ports, two address check units, and a common hit/miss logic unit. Each address check unit performs address check for a respective processing unit to determine whether a target memory address for a memory access by that processing unit is currently in the cache memory. The hit/miss logic unit decides which processing unit gets access to which memory. If the two processing units desire access to two memories at two different levels, which is the most likely scenario for some applications, then the hit/miss logic unit can accommodate both memory accesses simultaneously. This capability can significantly reduce the likelihood of one processing unit (e.g., the processor core) being stalled whenever the other processing unit (e.g., the DMA controller) is accessing memory.

In one aspect, an integrated circuit (IC) is presented comprising: a processor core operable to perform data processing for the integrated circuit; a cache memory operable to store data for the processor core; and an on-chip memory operable to store data for the cache memory, wherein the cache memory is filled with data from the on-chip memory for cache misses, and wherein the on-chip memory is filled with data from an external memory under user control.

In another aspect, an IC is presented comprising: a first processor operable to perform general-purpose processing for the integrated circuit; a second processor operable to perform data processing for the integrated circuit and including a processor core operable to perform the data processing, and a first cache memory operable to store data for the processor core; an on-chip memory operable to store data for the first cache memory, wherein the first cache memory is filled with data from the on-chip memory for cache misses, and wherein the on-chip memory is filled with data from an external memory under user control; and a first memory bus coupling the first and second processors to the external memory.

In another aspect, an IC is presented comprising a cache controller operable to handle memory transactions for a cache memory and a second memory at two different levels of a cached memory system, the cache controller including a first address check unit coupled to a first processing unit and operable to determine whether a first memory address for a first memory access by the first processing unit is currently in the cache memory, a second address check unit coupled to a second processing unit and operable to determine whether a second memory address for a second memory access by the second processing unit is currently in the cache memory, and a logic unit coupled to the first and second address check units and operable to handle memory transactions for the first and second memory accesses by the first and second processing units.

In another aspect, a method is presented for handling memory transactions for a cached memory system, comprising: determining whether a first memory address for a first memory access by a first processing unit is currently in a cache memory; determining whether a second memory address for a second memory access by a second processing unit is currently in the cache memory; and allowing the first and second processing units to concurrently access the cache memory and a second memory, respectively, if the first processing unit encounters a cache hit and the second processing unit encounters a cache miss, wherein the cache memory and the second memory are memories at two different levels of the cached memory system.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs. As used herein, "off-chip" and "external" refer to a unit located outside of an integrated circuit (IC), and "on-chip" refers to a unit located within an IC. An IC includes one or more IC dies encapsulated within an IC package, and all units fabricated on the IC die(s) are considered to be on-chip. As used herein, "data" can specifically refer to input data (e.g., operands) for a processor and can also generically refer to any type of data, depending on the context in which the term is used.

Figure 1:
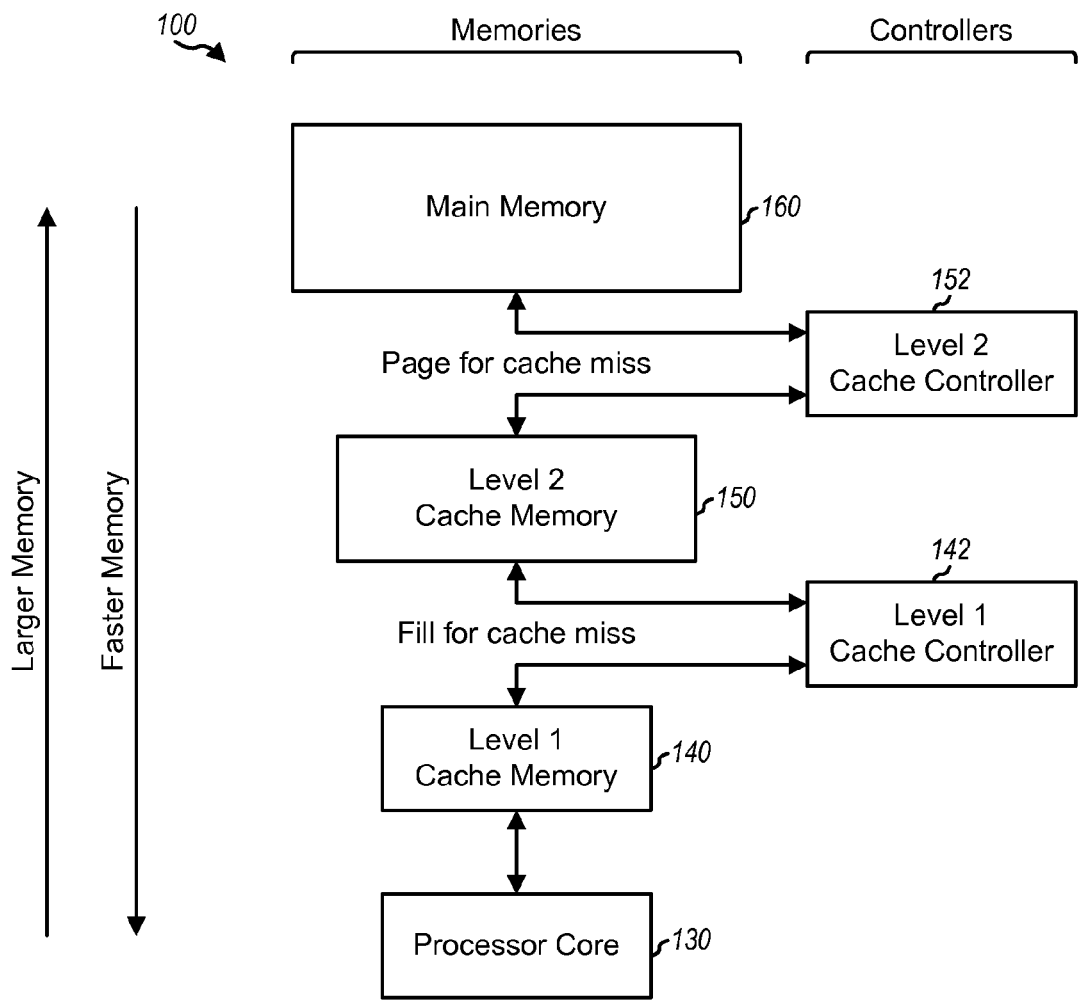
FIG. 1 shows a conventional 2-level cached memory system.

FIG. 1 shows a block diagram of a conventional 2-level cached memory system 100. In memory system 100, a level 1 cache memory 140 is the fastest but also smallest memory and is located closest to a processor core 130. A level 2 cache memory 150 is the next larger but slower memory. A main memory 160 is the largest but also slowest memory and is typically located off-chip. Memories 140 through 160 are typically random access memories (RAMs) and may be fabricated with the same or different memory technologies. In general, a cached memory system may include any number of memory levels. Memory speed decreases but memory size increases as one moves up the memory hierarchy.

Cache controllers 142 and 152 handle all memory transactions for cached memory system 100 to ensure that the correct data is being accessed at all times by processor core 130. Cache controllers 142 and 152 also handle retrieval and storage of instructions/data between different levels of memories in the cached memory system. Level 1 cache controller 142 is responsible for filling level 1 cache memory 140 with instructions/data from level 2 cache memory 150. Cache memory 140 is typically filled with one or more cache lines whenever there is a "cache miss", which simply means that the instructions/data needed by processor core 130 is not present in cache memory 140. A cache memory may be viewed as a two-dimensional array of memory cells. A cache line is one line of data in the cache memory and has a dimension corresponding to the width of the cache memory array. A cache line is also commonly referred to as a block. Level 2 cache controller 152 is responsible for paging instructions/data for level 2 cache memory 150 from main memory 160. Cache memory 150 is typically paged with multiple blocks of instructions/data whenever the instructions/data needed by processor core 130 are not present in cache memory 140 or 150.

In general, "filling" and "paging" are synonymous terms that refer to the retrieval and storage of instructions/data between different levels of memories in the cached memory system. The cache controllers perform paging in a manner to maintain "cache coherence" (or data integrity) among the different levels of memories. Cache coherence refers to the synchronization of the different levels of memories so that no data is lost. Data loss can occur, for example, if processor core 130 writes a new value into cache memory 140 and this value does not get copied to main memory 160 when a cache line containing the new value in cache memory 140 is replaced by a cache fill.

Figure 2:
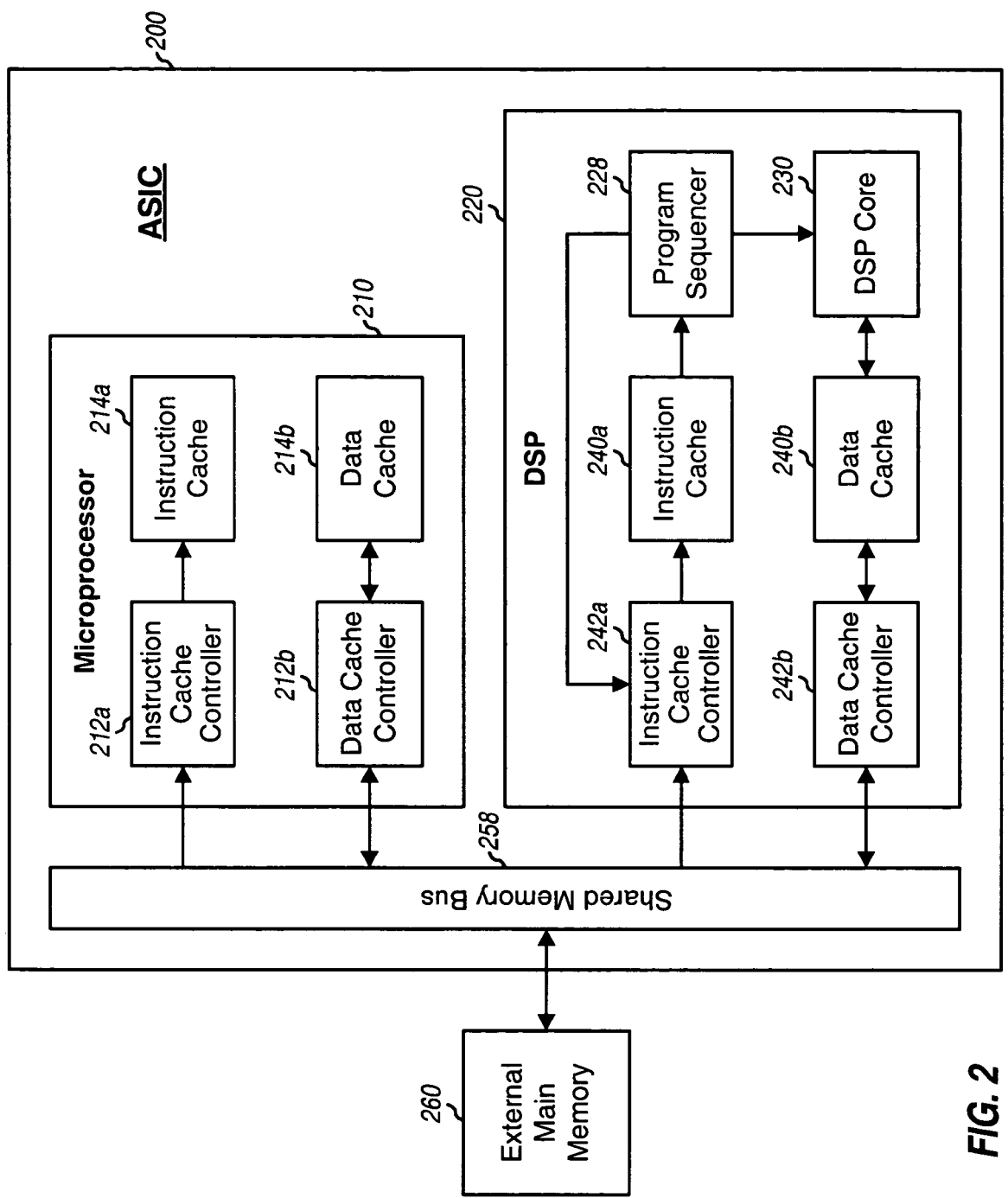
FIG. 2 shows an ASIC with multiple embedded processors and a single-level cached memory system.

FIG. 2 shows an ASIC 200 with multiple embedded processors and a single-level cached memory system. ASIC 200 includes a microprocessor 210, a DSP 220, and a shared memory bus 258 that couples to an external main memory 260 located outside of ASIC 200. Microprocessor 210 implements a "Harvard" architecture, which uses separate instruction cache 214a and data cache 214b to store instructions and data, respectively. An instruction cache controller 212a and a data cache controller 212b are responsible for paging instructions and data back and forth between external memory 260 and cache memories 214a and 214b, respectively.

Similarly, DSP 220 includes separate instruction cache 240a and data cache 240b to store instructions and data, respectively. An instruction cache controller 242a and a data cache controller 242b are responsible for paging instructions and data for cache memories 240a and 240b, respectively. A program sequencer 228 receives instructions from instruction cache 240a and directs the operation of a DSP core 230. DSP core 230 includes various processing units (e.g., multiply-accumulate units, arithmetic logic units, and so on) that perform mathematical computation and other processing for DSP 220. Program sequencer 228 also identifies upcoming instructions and sends back this information so that instruction cache controller 242a can check to see if these instructions are present in instruction cache 240a or need to be retrieved from external memory 260.

Whenever DSP 220 makes a memory access for instruction or data, the appropriate cache controller checks to see if the desired instruction/data is in the cache. If the answer is 'yes', then a "cache hit" has occurred, and DSP 220 uses the instruction/data stored in the cache and continues processing. Otherwise, if the answer is 'no', then a "cache miss" has occurred, and DSP 220 is stalled while the cache controller fetches a cache line containing the desired instruction or data from external memory 260. Once the "cache fill" is completed, DSP 220 resumes processing. For both microprocessor 210 and DSP 220, the cache controllers maintain cache coherence between their cache memories and external memory 260.

It is desirable to have separate cache memories for microprocessor 210 and DSP 220, as shown in FIG. 2, to improve the performance of these processors. However, due to cost constraints and IC pin limitations, the embedded microprocessor and DSP typically share the same memory bus 258 and external memory 260, as also shown in FIG. 2. This forces microprocessor 210 and DSP 220 to compete for access to external memory 260.

Processors with a cached memory system, such as that shown in FIG. 2, are often needed to meet processing speed requirements of many modern-day applications such as wireless communication (e.g., cellular phone). However, the cached memory system can create problems for the embedded DSP such as (1) reception of high-rate input data and (2) completion of real-time processing tasks within specified time deadlines, as described below. These problems are more acute when one or more other processors share the same memory system with the DSP so that latency (i.e., delay) and bandwidth requirements cannot be guaranteed for the DSP.

An embedded DSP for cellular phone applications often uses direct memory access (DMA) channels to receive and/or send DMA data streams. DMA data is typically real-time high-rate data exchanged between the DSP and other processing units external to the DSP. However, DMA data may also be instructions or other types of data. Multiple DMA channels may be operated in parallel to allow multiple data streams to be processed by the DSP at the same time. The cached memory system complicates reception of a high-rate DMA data stream via a DMA channel. As the DSP receives incoming DMA data via the DMA channel, the data cache controller needs to determine whether a buffer used for storing the DMA data currently resides in the data cache. If this is the case, then the DSP can simply write the incoming DMA data into the data cache and proceed onward. However, if the buffer is currently not in the data cache, then the DSP has two options for storing the incoming DMA data. For the first option, the data cache controller can execute a cache line fill to bring the buffer from the external memory into the data cache, and the DSP can then write the incoming DMA data into the data cache. For the second option, the DSP can write the incoming DMA data directly to the buffer in the external memory.

Typically, the DSP is stalled whenever DMA data is received via the DMA channels. Furthermore, both of the options described above rely on the DSP obtaining access to the external memory via the shared memory bus and completing the data write before new DMA data arrives. If the DSP shares the memory bus with one or more other processors, then the DSP typically cannot be guaranteed instant access to the external memory because another processor may be using it. If the DSP cannot gain access to the external memory in time, then the incoming DMA data may be lost, which is highly undesirable.

The cached memory system also makes it difficult for the DSP to guarantee completion of real-time processing tasks within specified time deadlines. Cache memories normally use "paging-on-demand", which means that instructions and data are only fetched from the external memory when they are discovered to be missing in the cache memories. If the external memory happens to be busy when a cache miss occurs, then the DSP will be stalled until the external memory becomes free and can be accessed by the DSP to complete its cache fill. Thus, the DSP may not be able to perform/complete processing on real-time input data due to (1) the wait for the external memory to become free and/or (2) the overhead and delay associated with performing a cache fill from the external memory for a cache miss. Pre-fetch techniques may be used to try to fetch the next cache line in advance and minimize the likelihood of a cache miss. However, these techniques are often only partially effective because the cache controllers normally cannot see very far in advance.

Figure 3:
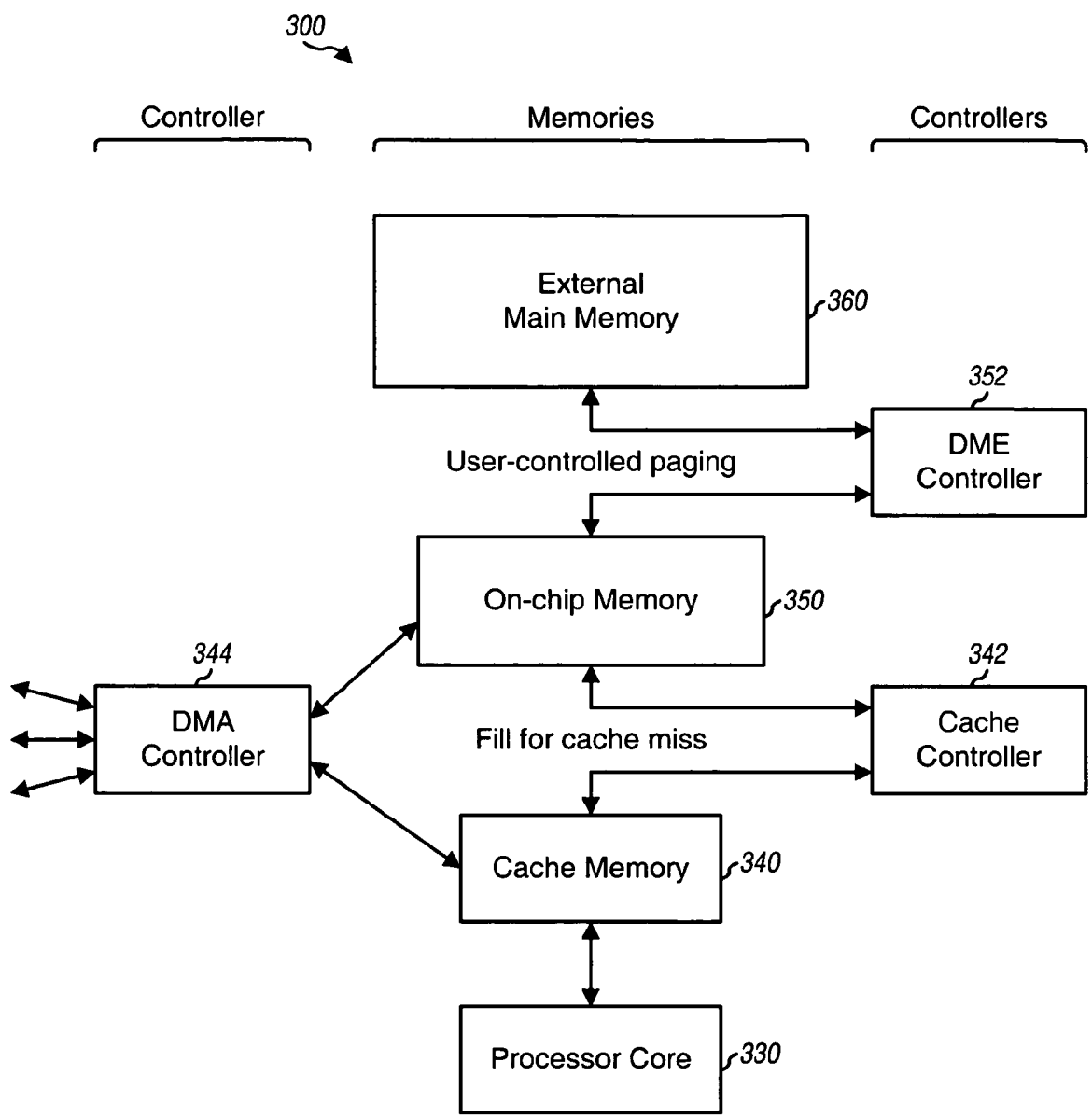
FIG. 3 shows the innovative cached memory system.

FIG. 3 shows a block diagram of an innovative cached memory system 300 that can handle high-rate DMA data and ensure that the DSP can meet real-time constraints. Memory system 300 includes (1) a cache memory 340 located closest to a processor core 330, (2) an on-chip memory 350 at the next higher memory level above cache memory 340, and (3) an external main memory 360 at the next higher memory level above on-chip memory 350. A cache controller 342 handles paging of instructions and data between cache memory 340 and on-chip memory 350 for cache misses, similar to the cache memory system described for FIG. 1. A DME controller 352 handles user-controlled paging between on-chip memory 350 and external memory 360. Thus, a human user/programmer takes care of paging instructions and data between external memory 360 and on-chip memory 350 via DME controller 352.

Cached memory system 300 utilizes a different type of memory level in the memory hierarchy than cached memory system 100. This is because on-chip memory 350 is different from a conventional level 2 cache memory. One advantage of cached memory system 300 is that the user/programmer can arrange to have the instructions and data required by processor core 330 to be present in on-chip memory 350 well in advance of when they are actually needed by the processor core. A conventional level 2 cache controller would only fetch instructions and data if and when they are needed by the processor core, and the processor core is stalled while the instructions/data are fetched from the external memory. Cached memory system 300 can thus ensure that the DSP can meet real-time constraints even though it may not have guaranteed access and bandwidth to external memory 360.

FIG. 3 also shows the storage of high-rate DMA data to the memories within cached memory system 300. A DMA controller 344 receives incoming data via one or more DMA channels and can store the data to either cache memory 340 or on-chip memory 350, depending on where the buffer for the data is currently located. The incoming data does not need to be stored to external memory 360, which avoids data loss due to a busy external memory. DMA controller 344 also operates with cache controller 342 to maintain cache coherence, but this is not shown in FIG. 3 for simplicity. An exemplary ASIC design using cached memory system 300 is described below.

Figure 4:
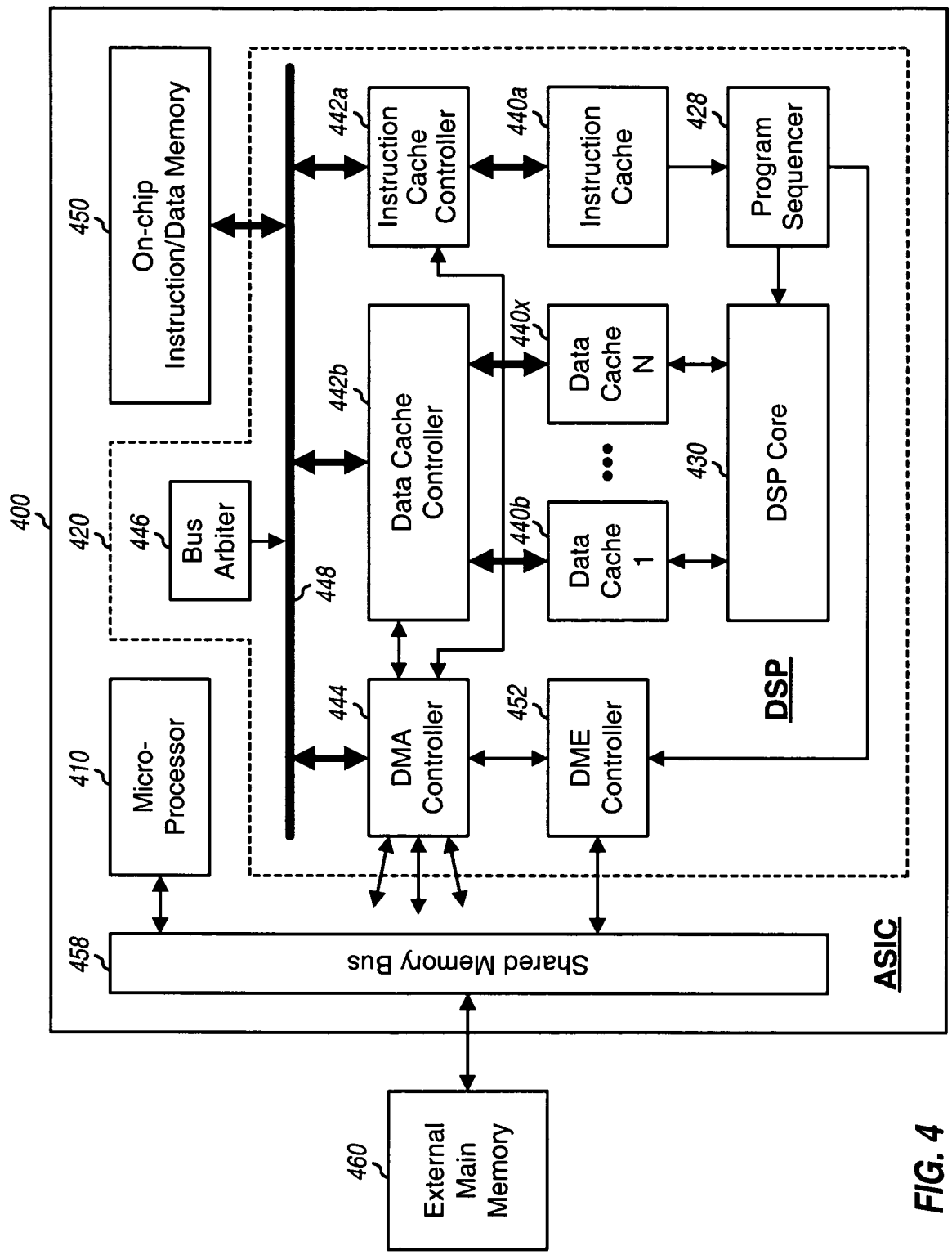
FIG. 4 shows an ASIC with multiple embedded processors and the innovative cached memory system.

FIG. 4 shows an ASIC 400 with multiple embedded processors and the cached memory system shown in FIG. 3. ASIC 400 includes a microprocessor 410, a DSP 420, an on-chip instruction/data memory 450, and a shared memory bus 458 that couples to an external main memory 460. Microprocessor 410 may implement the Harvard architecture for its cache memories, as described above for microprocessor 210 in FIG. 2.

For the embodiment shown in FIG. 4, DSP 420 includes an instruction cache 440a that stores instructions and N data caches 440b through 440x that store data for the DSP. In general, N may be any integer one or greater (e.g., N=2 or 3). An instruction cache controller 442a is responsible for paging instructions back and forth between on-chip memory 450 and instruction cache 440a, and a data cache controller 442b is responsible for paging data between on-chip memory 450 and data caches 440b through 440x. DSP 420 also includes a program sequencer 428 and a DSP core 430 that operate as described above for FIG. 2.

The cached memory system for DSP 420 is composed of (1) instruction and data caches 440 for level 1 cache memories, (2) on-chip memory 450 for the next higher level memory, and (3) external memory 460 for the topmost level memory. (The numeral "440" can refer to any one, any combination, or all of caches 440a through 440x, depending on the context in which it is used.) Caches 440 are filled with instructions/data from on-chip memory 450, and on-chip memory 450 is filled with instructions/data from external memory 460. On-chip memory 450 may be implemented as a RAM or some other type of memory. On-chip memory 450 may also be of any size and dimension. In an embodiment, on-chip memory 450 is dimensioned with the same width as level 1 caches 440 to facilitate data transfers. On-chip memory 450 may be implemented as either an embedded memory (i.e., fabricated on the same IC die as DSP 420) or a stacked memory (i.e., fabricated on a different IC die than DSP 420). On-chip memory 450 can store instructions and data for caches 440, exchange instructions/data with external memory 460 under user/programmer control, and store high-rate DMA data, as described below.

DSP 420 further includes an internal memory bus 448 that couples instruction cache controller 442a, data cache controller 442b, and a DMA controller 444 to on-chip memory 450. Memory bus 448 facilitates paging of instructions and data between on-chip memory 450 and caches 440. Memory bus 448 further facilitates storage of DMA data from DMA controller 444 to on-chip memory 450. Memory bus 448 may be designed as a high-capacity bus to provide high bandwidth for data transfers and to ensure easy accessibility of on-chip memory 450. In an embodiment, memory bus 448 is implemented with a width that is equal to a cache line for caches 440. However, other memory bus widths may also be used. A bus arbiter 446 arbitrates the use of memory bus 448 among the DMA and cache controllers.

Cache controllers 442a and 442b can page caches 440 from on-chip memory 450 with little overhead. For example, if on-chip memory 450, memory bus 448, and the buses for cache controllers 442a and 442b have widths of one cache line, then a cache line fill for instruction cache 440a or any one of data caches 440b through 440x may be performed in as little as one clock cycle. The latency for a cache fill is thus bounded and not dependent on accessibility of the shared memory bus 458 and external memory 460.

DMA controller 444 couples to cache controllers 442a and 442b and internal memory bus 448. DMA controller 444 has L DMA channels that can receive high-rate DMA data from other processing units external or internal to ASIC 400. In general, L can be any integer one or greater. DMA controller 444 handles the storage of DMA data received via the DMA channels to either caches 440 or on-chip memory 450. Whenever a DMA sample (or a group of DMA samples) is received via a DMA channel, DMA controller 444 ascertains whether the sample(s) should be stored in instruction cache 440a or one of the data caches 440b through 440x, determines the memory address for the DMA sample(s), and provides the address to the appropriate cache controller. Each cache controller 442 maintains a cache tag RAM that stores the line addresses of all lines of on-chip memory 450 currently stored in the cache memory/memories under its control. The queried cache controller 442 checks its cache tag RAM to see if the cache line being accessed by DMA controller 444 is currently in cache 440. If the answer is 'yes', then DMA controller 444 provides the DMA sample(s) to cache controller 442, which then writes the sample(s) into cache 440. Otherwise, if the cache line being accessed is not in cache 440, then DMA controller 444 provides the DMA sample(s) via internal memory bus 448 for storage in on-chip memory 450.

On-chip memory 450 ensures that DMA transfers are not stalled and DMA data is not lost. This is because DSP 420 can always write the DMA data into on-chip RAM 450 rather than external memory 460, which is shared with microprocessor 410. On-chip RAM 450 has guaranteed bandwidth and bounded latency. The process of checking the cache tag RAM for each DMA transfer ensures cache coherency between caches 440 and on-chip RAM 450.

A DME controller 452 handles paging of instructions and data between on-chip memory 450 and external memory 460. For the embodiment shown in FIG. 4, DME controller 452 couples to shared memory bus 458 and to one DMA channel of DMA controller 444. DME controller 452 may be programmed by the user/programmer to page blocks of instructions/data between on-chip memory 450 and external memory 460. Each DME transfer passes through DMA controller 444, which performs the cache tag checking process to ensure cache coherence between on-chip memory 450 and caches 440 for the DME transfer.

With on-chip memory 450 and DME controller 452, DSP 420 can meet real-time constraints since latency for cache fills can be bounded. Unlike a conventional level 2 cache memory that is under the (automatic) control of a level 2 cache controller, which pages instruction/data on-demand for cache misses, DME controller 452 can be controlled and scheduled by the user/programmer to bring blocks of instructions/data from external memory 460 into on-chip memory 450 well in advance of when they are needed. Having the user/programmer act as an anticipatory cache controller means that the level 1 caches 440 will always find the instructions and data they need in on-chip memory 450. The worst-case latency for a cache fill of any level 1 cache 440 is then determined by the transfer between on-chip memory 450 and the cache 440 and is not dependent on the availability of shared memory bus 458 and external memory 460 at the time of the cache fill. The transfer between on-chip memory 450 and any cache 440 can be quite fast, as described above. By bounding the worst-case latency in this manner, the user/programmer can ensure that the DSP can meet real-time constraints.

FIG. 4 represents a specific implementation of the cached memory system shown in FIG. 3. In general, this cached memory system may be implemented in various manners, with any number of cache memories for instructions/data, using various types and combinations of controllers, and so on. Moreover, the memories and controllers may be coupled in various manners, which may be different from that shown in FIG. 4. For example, the DME controller may couple directly to the instruction and data cache controllers instead of to the DMA controller.

Figure 5:
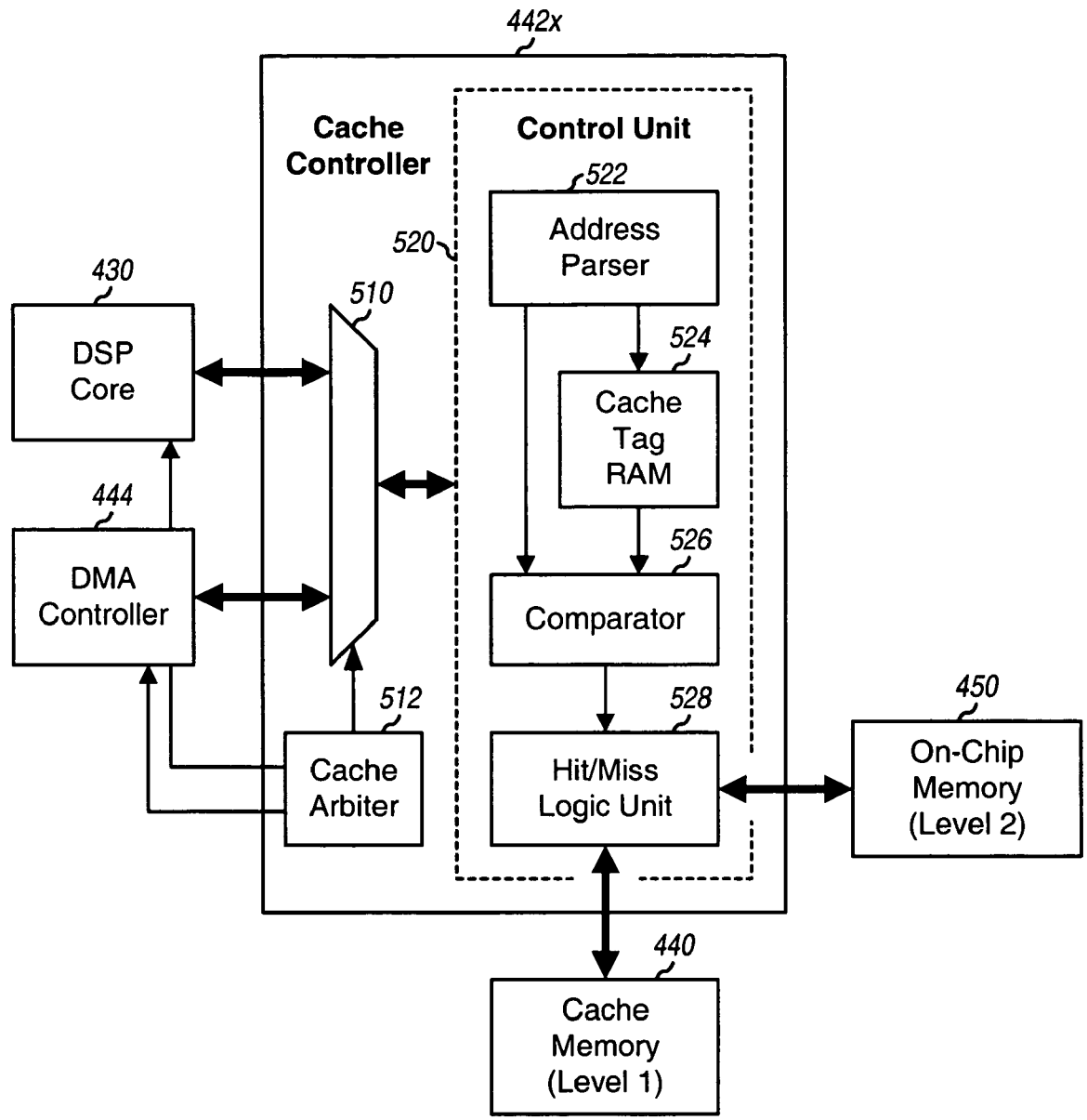
FIG. 5 shows a cache controller that can serve two processing units.

FIG. 5 shows an embodiment of a cache controller 442x, which may be used for instruction cache controller 442a or data cache controller 442b in FIG. 4. For this embodiment, cache controller 442x includes a multiplexer 510, a cache arbiter 512, and a control unit 520. Multiplexer 510 couples to DSP core 430 and DMA controller 444 and facilitates memory transactions for these two units. Cache arbiter 512 receives memory access requests from DSP core 430 and DMA controller 444, controls access to cache controller 442x, and decides whether DSP core 430 or DMA controller 444 can obtain access to cache controller 442x if there is contention. For simplicity, FIG. 4 shows DSP core 430 being coupled directly to data caches 440b though 440x. In actuality, DSP core 430 couples to data caches 440 via data cache controller 442b.

Control unit 520 performs address checking for all memory accesses of cache memory 440 to ensure that the correct data is being accessed at all times. Within control unit 520, a cache tag RAM 524 keeps track of which lines in the on-chip memory are currently stored in cache memory 440. Cache tag RAM 524 stores a table that contains a tag for each of the cache line in cache memory 440. The tag for each cache line indicates the specific line in the on-chip memory being stored in cache memory 440 for that cache line.

The size of a cache memory is typically much smaller than the size of the on-chip memory. Consequently, there are many possible lines in the on-chip memory that may be mapped to each line in the cache memory. As an example, the on-chip memory may be 256 k words in size, and the cache memory may be 4 k words in size. A full address for the on-chip memory would then contain 18 bits. If each cache line contains 8 words, then the on-chip memory would contain $2^{15}$ lines and the cache memory would contain $2^9$ or 512 lines. Each line in the cache memory can be identified by a 9-bit cache line address. For a direct mapped cache structure, each line in the on-chip memory can be mapped to only one line in the cache memory, and each line in the cache memory is associated with a 6-bit tag that identifies the specific one of the $2^6$ possible lines in the on-chip memory that is currently stored in the cache memory for that cache line. For an M-way set associate cache structure, each line in the on-chip memory can be mapped to any one of M possible lines in the cache memory.

Figure 6:
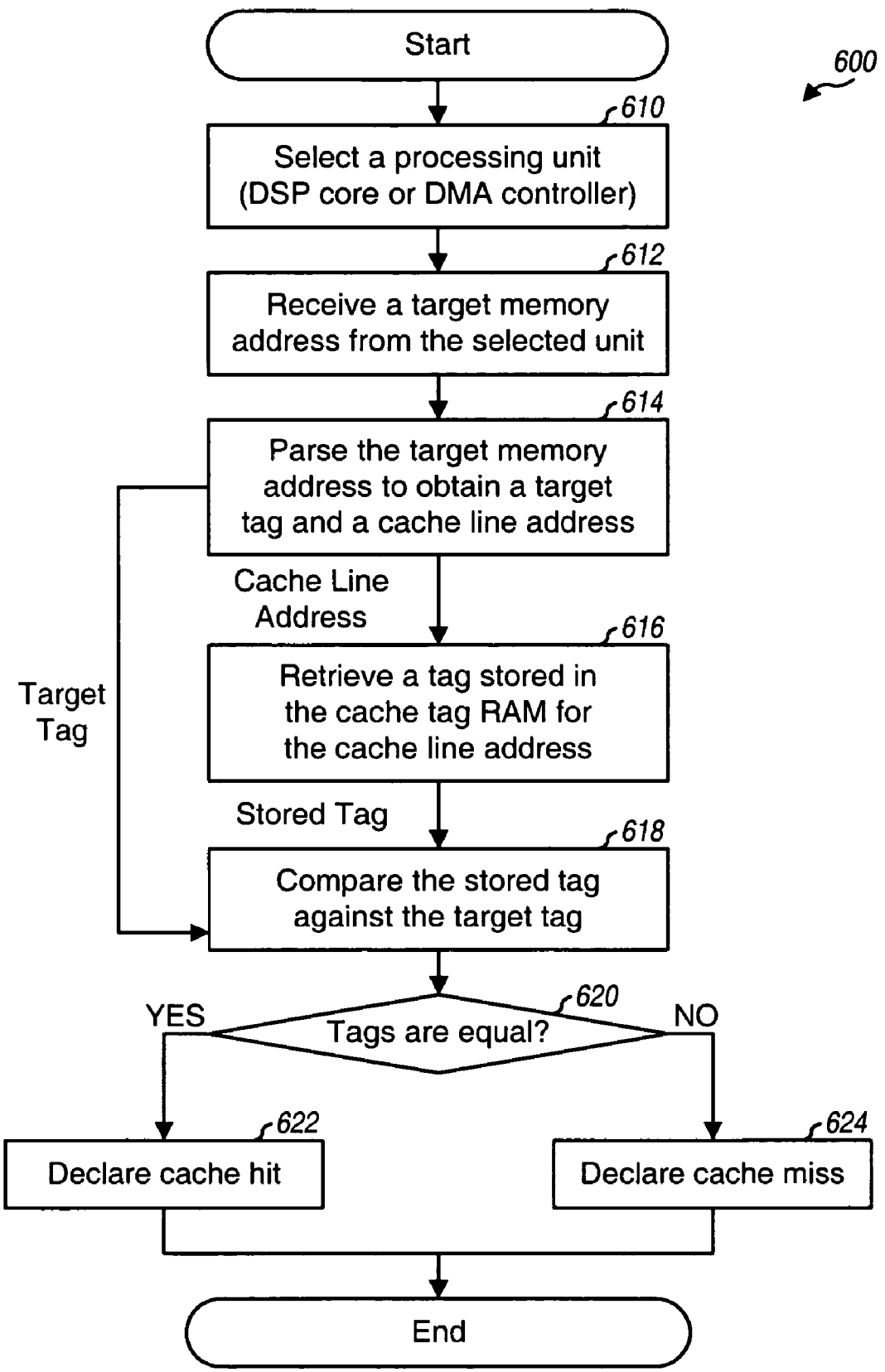
FIG. 6 shows an address checking process performed by the cache controller in FIG. 5.

FIG. 6 shows a flow diagram of an address checking process 600 performed by cache controller 442x to determine whether a given memory address being accessed (the "target" memory address) is currently in cache memory 440. One processing unit (either DSP core 430 or DMA controller 444) is selected for access by cache arbiter 512 (block 610). A target memory address is received from the selected processing unit by cache controller 442x (block 612) and parsed to obtain a target tag and a cache line address (block 614). For the example described above with the direct mapped cache structure, an 18-bit target memory address can be parsed into (1) a 6-bit target tag formed by the 6 most significant bits of the target memory address and (2) a 9-bit cache line address formed by the 9 next most significant bits of the target memory address. The tag stored in cache tag RAM 524 for the cache line address is retrieved (block 616). The stored tag is then compared against the target tag (block 618). If the two tags are equal (i.e., the answer is 'yes' for block 620), then a cache hit is declared (block 622). Otherwise, a cache miss is declared (block 624). Multiple tags may be retrieved from cache tag RAM 524 and compared against the target tag for the M-way set associate cache structure.

Referring back to FIG. 5, cache tag RAM 524 stores the tag for each cache line in cache memory 440 and is continually updated whenever any cache line in cache memory 440 is replaced. An address parser 522 receives the target memory address from DSP core 430 or DMA controller 444 for a memory access, parses the target memory address to obtain the target tag and the cache line address, provides the cache line address to cache tag RAM 524, and provides the target tag to a comparator 526. Cache tag RAM 524 provides the stored tag for the cache line address. Comparator 526 compares the stored tag against the target tag and indicates a cache hit if the tags are equal and a cache miss if they are different. Cache tag RAM 524 may be accessed multiple times if the cached memory system implements the M-way set associate cache structure. In any case, cache tag RAM 524 is accessed for every memory transaction in the cached memory system.

Hit/miss logic unit 528 handles access of cache memory 440 if there is a cache hit. If the memory access is a read, then cache memory 440 is accessed to read the instruction/data stored at the target memory address. If the memory access is a write, then cache memory 440 is written at the target memory address and a cache "dirty bit" is updated to indicate that the cache line has been written to, so that the line will be written back to on-chip memory 450 (which is the next higher level memory) when the line is replaced. Hit/miss logic unit 528 also directs a cache fill of cache memory 440 from on-chip memory 450 if there is a cache miss. In this case, DSP core 430 and/or DMA controller 444 are stalled while the target cache line is filled from on-chip memory 450 and cache tag RAM 524 is updated to reflect the new line in cache memory 440.

Cache controller 442x maintains coherence between cache memory 440 (a level 1 cache memory) and on-chip memory 450 (the next higher level memory). Cache controller 442x uses its cache tag RAM 524 to mark which lines are resident in cache memory 440 at any given moment and which lines need to be written back to on-chip memory 450 for a cache fill. Having both DSP core 430 and DMA controller 444 go through the same cache controller 442x ensures cache coherency. However, since cache controller 442x can serve only one processing unit at a time, DSP core 430 is stalled whenever DMA controller 444 accesses cache memory 440 or on-chip memory 450.

Cache hit rates for DSP core 430 are typically on the order of 99%, so it is very likely that the DSP core desires access to cache memory 440. DMA data storage is typically handled using double buffers, which means that the incoming DMA data is written to one buffer (the "current" buffer) and the DMA data stored in another buffer (a "filled" buffer) is processed by the DSP. Thus, DSP core 430 should not be accessing the same buffer that DMA controller 444 is writing to (due to synchronization difficulties). Furthermore, it is very likely that the current buffer is not resident in cache memory 440 and that DMA controller 444 desires access to on-chip memory 450. Since the most common case is for DSP core 430 to access cache memory 440 and for DMA controller 444 to access on-chip memory 450, a cache controller may be designed to allow both accesses to occur simultaneously to minimize stalling the DSP core for DMA memory accesses.

Figure 7:
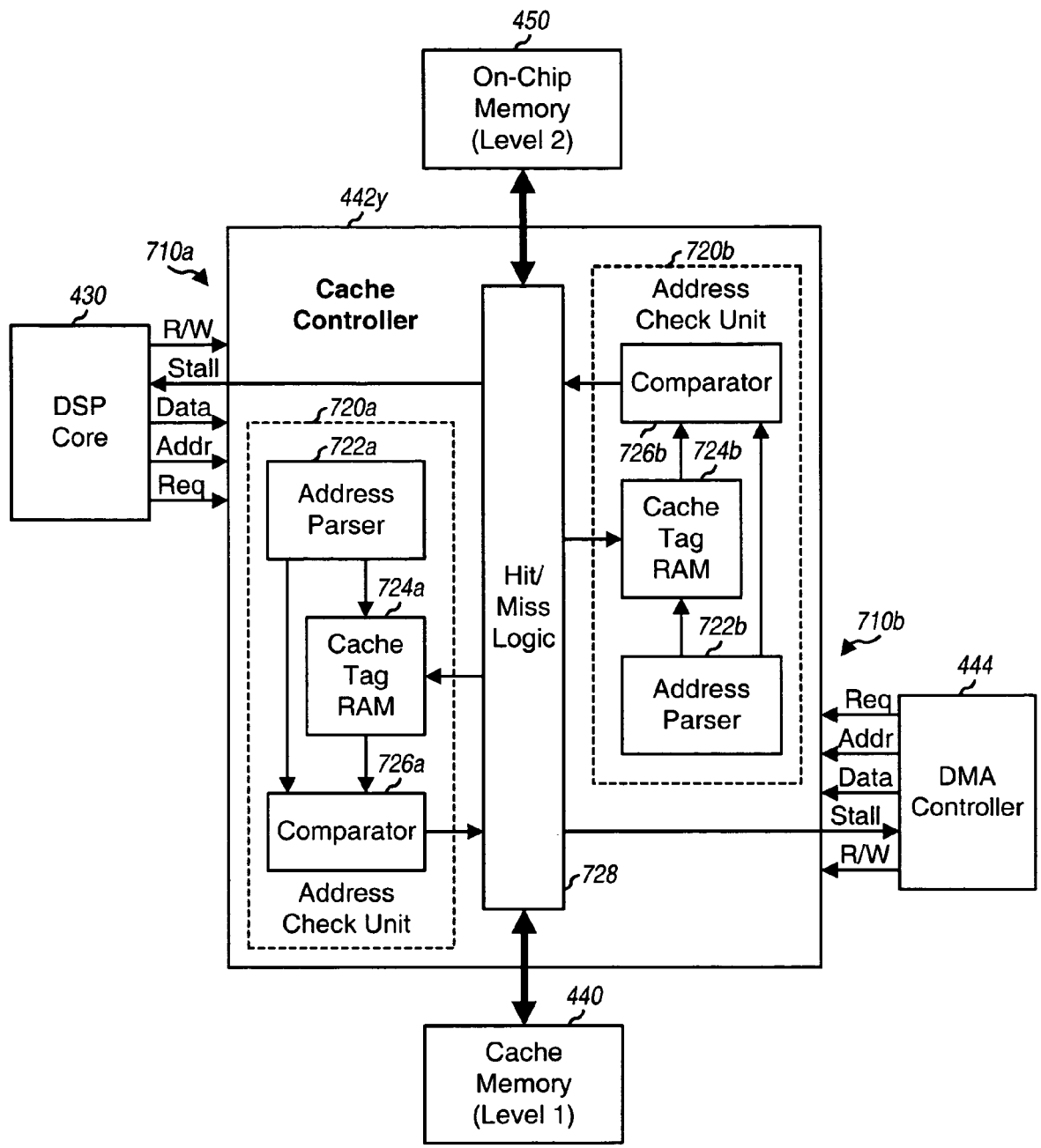
FIG. 7 shows a cache controller capable of allowing two processing units to simultaneously access two memories at two different levels in the memory system.

FIG. 7 shows an embodiment of a cache controller 442y, which allows two processing units to simultaneously access two memories at two different levels in the cached memory system. Cache controller 442y may also be used for instruction cache controller 442a or data cache controller 442b in FIG. 4. For this embodiment, cache controller 442y has two sets of I/O ports 710a and 710b, two address check units 720a and 720b, and a common hit/miss logic unit 728. Cache controller 442y interfaces with DSP core 430 via I/O ports 710a and with DMA controller 444 via I/O ports 710b. Address check unit 720a performs address check for DSP core 430 to determine whether a target memory address for a memory access by the DSP core is currently in cache memory 440. Similarly, address check unit 720b performs address check for DMA controller 444 to determine whether a target memory address for a memory access by the DMA controller is currently in cache memory 440.

Each address check unit 720 includes an address parser 722, a cache tag RAM 724, and a comparator 726. For each address check unit 720, address parser 722 receives and parses the target memory address from the associated processing unit (either DSP core 430 or DMA controller 444) into the target tag and the cache line address. Cache tag RAM 724 provides the stored tag for the cache line address. Comparator 726 compares the stored tag against the target tag and provides the comparison result to hit/miss logic unit 728.

Hit/miss logic unit 728 includes a cache arbiter that decides which processing unit gets access to which memory. For the most common scenario, DSP core 430 desires access to cache memory 440 and DMA controller 444 desires access to on-chip memory 450. This event is indicated by DSP core 430 encountering a cache hit and DMA controller 444 encountering a cache miss for the same access cycle. In this case, hit/miss logic unit 728 can accommodate both memory accesses simultaneously, so that DSP core 430 can access cache memory 440 and DMA controller 444 can access on-chip memory 450 in the same cycle. This capability can significantly reduce the frequency/likelihood of the DSP core stalling due to DMA memory accesses.

Hit/miss logic unit 728 also handles contention between DSP core 430 and DMA controller 444. For example, if both DSP core 430 and DMA controller 444 desire access to the same memory, then hit/miss logic unit 728 may allow one of the processing units to access the memory and stall the other processing unit. If DSP core 430 desires access to cache memory 440 but encounters a cache miss, then hit/miss logic unit 728 may stall one or both processing units. These two scenarios are typically low probability events so performance is not severely impacted by these events.

Hit/miss logic unit 728 also maintains cache tag RAMs 724a and 724b for address check units 720a and 720b, respectively. Cache tag RAMs 724a and 724b may be accessed independently but are updated simultaneously. Hit/miss logic unit 728 updates both cache tag RAMs 724a and 724b whenever the contents of cache memory 440 are updated, so that the cache tag RAMs are current and synchronized with the cache. Whenever a processing unit encounters a cache miss, hit/miss logic unit 728 may stall both processing units in order to fill cache memory 440 and update cache tag RAMs 724a and 724b.

Figure 8:
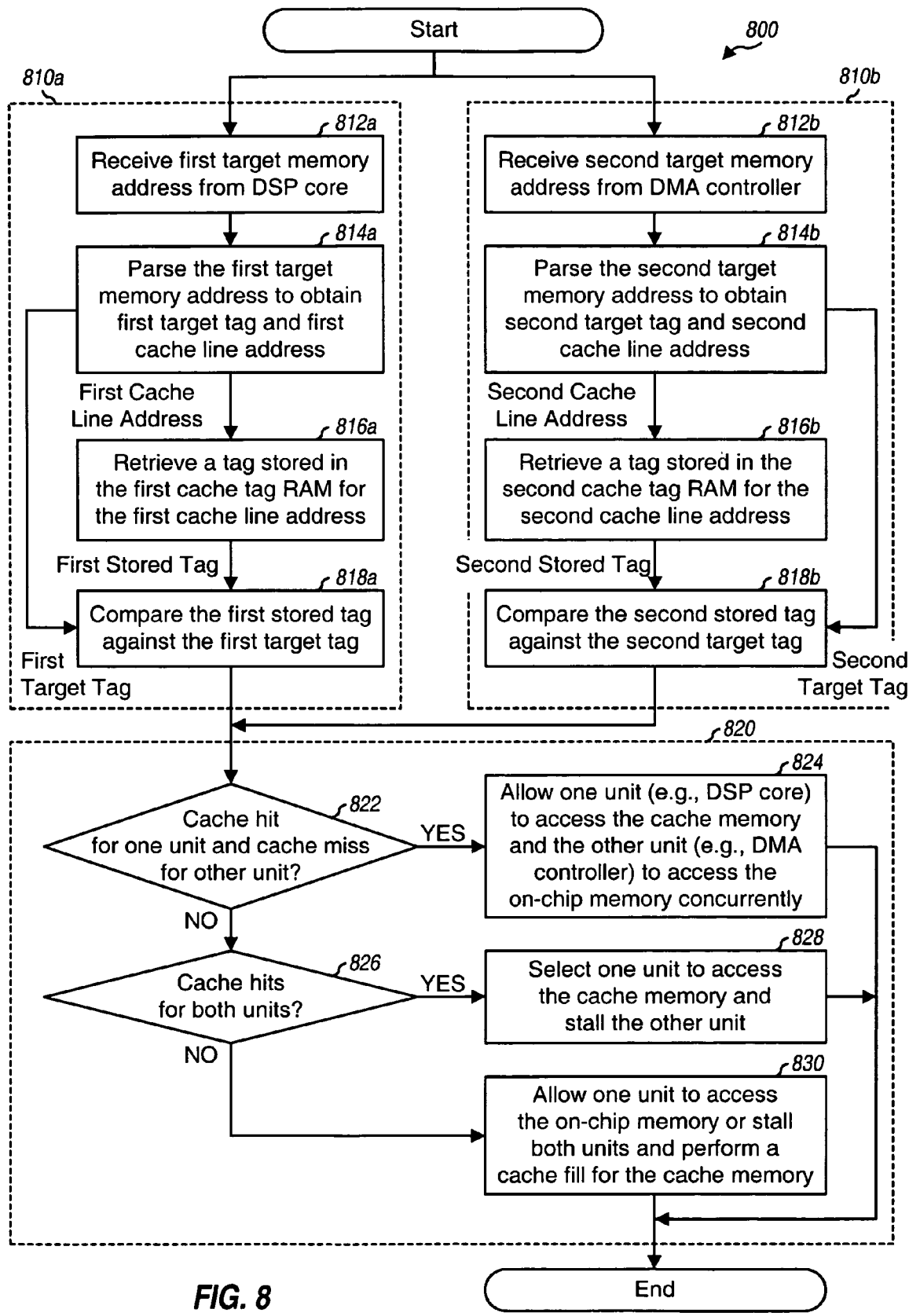
FIG. 8 shows an address checking process performed by the cache controller in FIG. 7.

FIG. 8 shows a flow diagram of a process 800 performed by cache controller 442y for concurrent memory accesses by DSP core 430 and DMA controller 444. In process 800, blocks 810a and 810b are performed by address check units 720a and 720b, respectively, and block 820 is performed by hit/miss logic unit 728. For each of blocks 810a and 810b, a target memory address is received from the associated processing unit (block 812) and parsed to obtain a target tag and a cache line address (block 814). The tag stored in the cache tag RAM for the cache line address is retrieved (block 816) and compared against the target tag (block 818). The results of the comparison for both blocks 810a and 810b are provided to hit/miss logic unit 728.

For block 820, if a cache hit is declared for one processing unit (e.g., the DSP core) and a cache miss is declared for the other processing unit (e.g., the DMA controller) (i.e., the answer is 'yes' for block 822), then one unit is allowed to access the cache memory and the other unit is allowed to access the on-chip memory (block 824). Otherwise, if cache hits are declared for both processing units (i.e., the answer is 'yes' for block 826), then one processing unit is selected to access the cache memory and the other processing unit is stalled (block 828). Otherwise, if cache misses are declared for both processing units (i.e., the answer is 'no' for block 826), then either (1) one processing unit is allowed to access the on-chip memory or (2) both processing units are stalled to perform a cache fill of the cache memory (block 830).

Cache controller 442y can provide improved performance over a conventional cache controller with a single address check unit. The conventional cache controller would normally stall the DSP core whenever the DMA controller accesses the memory. The DMA data rate may be a significant fraction of the DSP clock rate for many applications (e.g., image and video processing, 3-D gaming, and so on, for cellular phones). For the conventional cache controller, the high-rate DMA would cause the DSP core to stall and remain idle for a large fraction of the time. DMA memory accesses would then represent a large overhead for the DSP core, and a significant portion of the DSP processing capability would be wasted in stalls due to DMA. In contrast, with cache controller 442y, both DSP core 430 and DMA controller 444 can be served simultaneously via two I/O ports 710a and 710b, two address check units 720a and 720b, and hit/miss logic unit 728 that support parallel accesses to level 1and 2 memories. A large portion of the overhead for the DSP core can thus be avoided.

The innovative cached memory system and cache controller described herein may be used for various applications including wireless communication, computing, networking, personal electronics, and so on. An exemplary use for wireless communication is described below.

Figure 9:
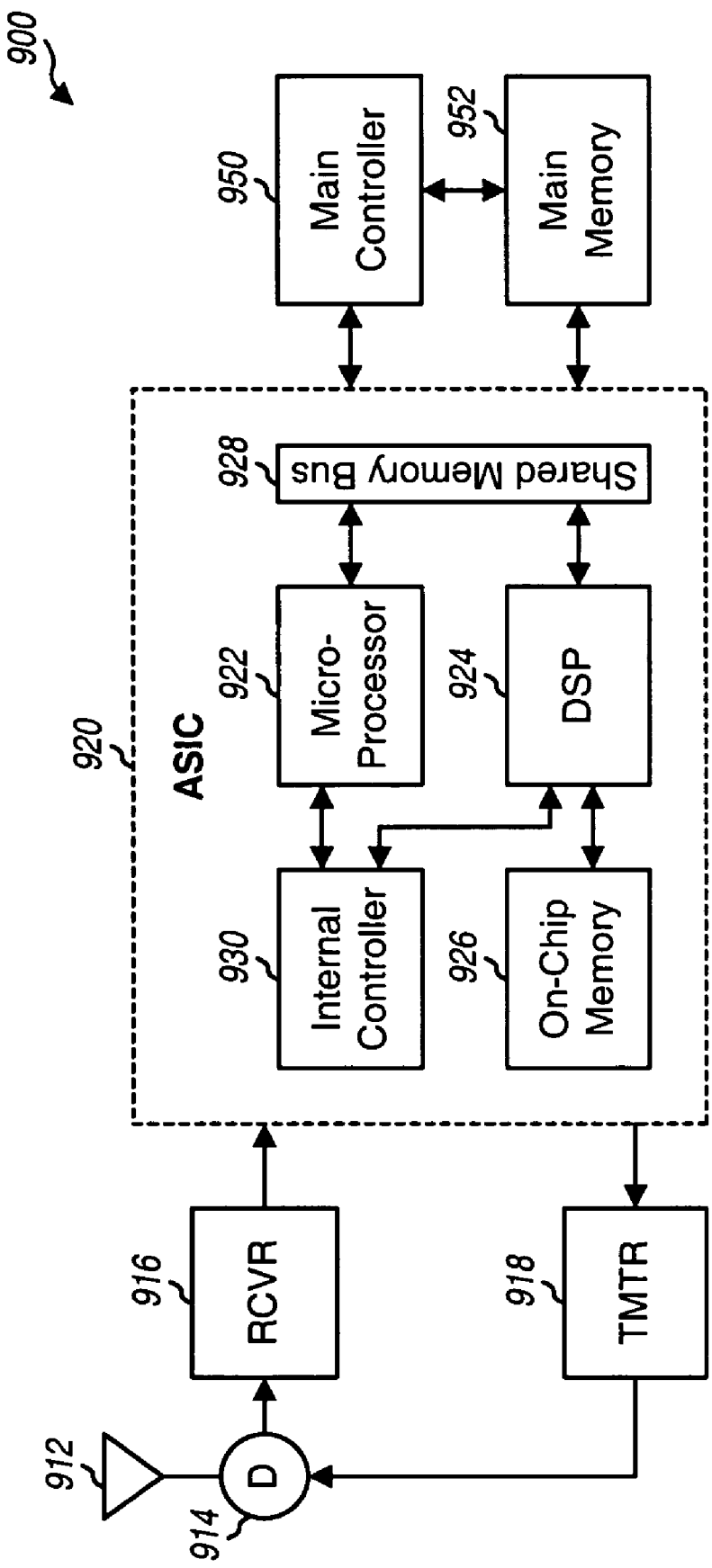
FIG. 9 shows a wireless device in a wireless communication system.

FIG. 9 shows a block diagram of a wireless device 900 in a wireless communication system. Wireless device 900 may be a cellular phone, a handset, a terminal, a mobile station, or some other devices or designs. The wireless communication system may be a Code Division Multiple Access (CDMA) system, a Global System for Mobile Communications (GSM) system, a multiple-input multiple-output (MIMO) system, an orthogonal frequency division multiplexing (OFDM) system, an orthogonal frequency division multiple access (OFDMA) system, and so on. Wireless device 900 is capable of providing bi-directional communication via a receive path and a transmit path.

For the receive path, signals transmitted by base stations in the system are received by an antenna 912, routed through a duplexer (D) 914, and provided to a receiver unit (RCVR) 916. Receiver unit 916 conditions (e.g., filters, amplifies, and frequency downconverts) the received signal, digitizes the conditioned signal, and provides data samples to an ASIC 920 for further processing. For the transmit path, data to be transmitted from wireless device 900 is provided by ASIC 920 to a transmitter unit (TMTR) 918. Transmitter unit 918 conditions (e.g., filters, amplifies, and frequency upconverts) the data and generates a modulated signal, which is routed through duplexer 914 and transmitted via antenna 912 to the base stations.

ASIC 920 includes various units such as, for example, a microprocessor 922, a DSP 924, an on-chip memory 926, a shared memory bus 928, and an internal controller 930. Microprocessor 922 may be used for general-purpose processing. DSP 924 may perform data processing for the transmit path (e.g., encoding, interleaving, modulation, code channelization, spectral spreading, filtering, and so on). DSP 924 may also perform data processing for the receive path (e.g., filtering, despreading, channelization, demodulating, deinterleaving, decoding, and so on). These various operations are known in the art. The specific processing to be performed by DSP 924 is dependent on the communication system. On-chip memory 926 provides data for the cache memories within DSP 924. Shared memory bus 928 interfaces microprocessor 922 and DSP 924 with other units external to ASIC 920. Internal controller 930 controls the operation of various processors within ASIC 920.

Controller 950 controls the operation of ASIC 920 and other units within wireless device 900 (not shown in FIG. 9 for simplicity). Memory unit 952 stores program code and data used by controller 950.

FIG. 9 shows an exemplary design of a wireless device in which the innovative cached memory system and cache controller described herein may be used. The cached memory system and cache controller may also be used in other electronic devices.

The innovative cached memory system and cache controller described herein may be implemented in various hardware units. For example, the cached memory system and cache controller may be implemented in an ASIC, a digital signal processing device (DSPD), a programmable logic device (PLD), a field programmable gate array (FPGA), a controller, a processor, and other electronic units.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An integrated circuit (IC) comprising:
a processor core operable to perform data processing for the integrated circuit;
a cache memory operable to store data for the processor core; and
an on-chip memory operable to store data for the cache memory, wherein the cache memory is filled with data from the on-chip memory for cache misses, and wherein the on-chip memory is selectably filled with data from an external memory independent of cache accesses of the cache memory under user control.

2. The integrated circuit of claim 1, further comprising:
a cache controller operable to handle memory transactions for the cache memory.

3. The integrated circuit of claim 2, further comprising:
a direct memory exchange (DME) controller operable to handle data transfers between the on-chip memory and the external memory.

4. The integrated circuit of claim 3, wherein the DME controller further operates with the cache controller to maintain data integrity for the cache memory.

5. The integrated circuit of claim 3, wherein the DME controller is selectably programmable by the user to fill the on-chip memory with data from the external memory independent of the cache misses, to thereby provide the user control.

6. The integrated circuit of claim 5, further comprising:
a shared memory bus connected to the DME controller and the external memory; and
a direct memory access (DMA) controller coupled to the cache controller, an internal memory bus, and said shared memory bus, wherein said DMA controller has a plurality of DMA channels that can receive high-rate DMA data by way of the shared memory bus or the internal memory bus.

7. The integrated circuit of claim 6, wherein the DME controller couples to at least one of the plurality of DMA channels, and said DME controller is selectably programmable to fill the on-chip memory with data from the external memory by paging blocks of instructions or data.

8. The integrated circuit of claim 3, wherein the DME controller is selectably programmable by a user to schedule the filling of on-chip memory with data from the external memory.

9. The integrated circuit of claim 3, wherein the DME controller is selectably programmable by the user to control the filling of the on-chip memory with data blocks from the external memory such that the user functions as an anticipatory cache controller.

10. The integrated circuit of claim 3, wherein the DME controller is selectably programmable by the user to fill the on-chip memory with data from the external memory well in advance of need by the processor core and without paging-on-demand.

11. The integrated circuit of claim 2, further comprising:
a direct memory access (DMA) controller operable to handle storage of DMA data received via at least one DMA channel to the cache memory or the on-chip memory, wherein the DMA controller further operates with the cache controller to maintain data integrity for the cache memory.

12. The integrated circuit of claim 11, further comprising:
a direct memory exchange (DME) controller operable to handle data transfers between the on-chip memory and the external memory, wherein the DME controller couples to the DMA controller via at least one DMA channel.

13. The integrated circuit of claim 11, further comprising:
an internal memory bus coupling the on-chip memory, the cache controller, and the DMA controller, wherein the internal memory bus has a width that is equal to a line in the cache memory.

14. The integrated circuit of claim 1, wherein the cache memory and the on-chip memory are fabricated on same integrated circuit die.

15. The integrated circuit of claim 1, wherein the cache memory and the on-chip memory are fabricated on different integrated circuit dies encapsulated within an IC package for the integrated circuit.

16. The integrated circuit of claim 1, wherein said integrated circuit is operable in a wireless device, said wireless device comprising:
an antenna to wirelessly communicate signals with a remote base station;
a receiver unit operably connected to said antenna and said integrated circuit to communicate a received signal from said antenna to said integrated circuit; and
a transmitter unit operably connected to said antenna and said integrated circuit to communicate data from said integrated circuit to said antenna as a transmission signal.

17. The integrated circuit of claim 1, wherein said integrated circuit is operable in a wireless device, said wireless device comprising:
means for communicating data between said integrated circuit and a remote base station.

18. The integrated circuit of claim 1, further comprising:
means for handling data transfers between the on-chip memory and the external memory, said means being selectably programmable by a user to fill the on-chip memory with data from the external memory independent of the cache misses.

19. The integrated circuit of claim 18, wherein said means is programmable to page blocks of instructions and/or data between the on-chip memory and the external memory.

20. The integrated circuit of claim 18, wherein said means is programmable to schedule the filling of the on-chip memory with data from the external memory.

21. A wireless apparatus comprising:
an integrated circuit including
a processor core operable to perform data processing,
a cache memory operable to store data for the processor core, and
an on-chip memory operable to store data for the cache memory; and
an external memory operable to store data for the on-chip memory, wherein the cache memory is filled with data from the on-chip memory for cache misses, and wherein the on-chip memory is selectably filled with data from the external memory independent of cache accesses of the cache memory under user control.

22. The integrated circuit of claim 21, further comprising:
a direct memory access (DMA) controller operable to handle storage of DMA data received via at least one DMA channel to the cache memory or the on-chip memory.

23. The wireless apparatus of claim 21, further comprising:
a direct memory exchange (DME) controller operable to handle data transfers between the on-chip memory and the external memory.

24. The wireless apparatus of claim 23, wherein said DME controller couples to at least one of a plurality of DMA channels, and said DME controller is selectably programmable to fill the on-chip memory with data from the external memory by paging blocks of instructions or data.

25. The wireless apparatus of claim 21, further comprising:
a shared memory bus connected to the DME controller and the external memory; and
a direct memory access (DMA) controller coupled to a cache controller, an internal memory bus, and said shared memory bus, wherein said DMA controller has a plurality of DMA channels that can receive high-rate DMA data by way of the shared memory bus or the internal memory bus.

26. The wireless apparatus of claim 21, wherein the DME controller is selectably programmable by a user to schedule the filling of on-chip memory with data from the external memory.

27. The wireless apparatus of claim 21, further comprising:
an antenna to wirelessly communicate signals with a remote base station;
a receiver unit operably connected to said antenna and said integrated circuit to communicate a received signal from said antenna to said integrated circuit; and
a transmitter unit operably connected to said antenna and said integrated circuit to communicate data from said integrated circuit to said antenna as a transmission signal.

28. The wireless apparatus of claim 21, further comprising:
means for communicating data between said integrated circuit and a remote base station.

29. The wireless apparatus of claim 21, further comprising:
means for handling data transfers between the on-chip memory and the external memory, said means being selectably programmable by a user to fill the on-chip memory with data from the external memory independent of the cache misses.

30. The wireless apparatus of claim 29, wherein said means is programmable to page blocks of instructions and/or data between the on-chip memory and the external memory.

31. The wireless apparatus of claim 29, wherein said means is programmable to schedule the filling of the on-chip memory with data from the external memory.

32. An integrated circuit comprising:
a first processor operable to perform general-purpose processing for the integrated circuit;
a second processor operable to perform data processing for the integrated circuit and including
a processor core operable to perform the data processing, and
a first cache memory operable to store data for the processor core;
an on-chip memory operable to store data for the first cache memory, wherein the first cache memory is filled with data from the on-chip memory for cache misses, and wherein the on-chip memory is selectably filled with data from an external memory independent of cache accesses of the first cache memory under user control; and
a first memory bus coupling the first and second processors to the external memory.

33. The integrated circuit of claim 32, wherein the second processor further includes a second cache memory operable to store instructions for the processor core, and wherein the second cache memory is automatically filled with instructions from the on-chip memory for cache misses.

34. The integrated circuit of claim 33, wherein the second processor further includes
a first cache controller operable to handle memory transactions for the first cache memory,
a second cache controller operable to handle memory transactions for the second cache memory,
a direct memory access (DMA) controller operable to handle storage of DMA data received via at least one DMA channel to the first cache memory, the second cache memory, or the on-chip memory, and
a direct memory exchange (DME) controller operable to handle data transfers between the on-chip memory and the external memory.

35. The integrated circuit of claim 34, wherein the DMA controller and the DME controller further operate with the first and second cache controllers to maintain data integrity for the first and second cache memories.

36. The integrated circuit of claim 34, wherein the second processor further includes a second memory bus coupling the on-chip memory, the first and second cache controllers, and the DMA controller, and wherein the DME controller couples to the DMA controller via at least one DMA channel.

* * * * *